(12) United States Patent
Lombarte

(10) Patent No.: US 8,957,626 B2
(45) Date of Patent: Feb. 17, 2015

(54) METHOD AND SYSTEM FOR REPLACING A CONTAINER OF INPUT ENERGY FOR A DRIVE MOTOR OF A MOTOR VEHICLE

(75) Inventor: Charles Lombarte, Saint Germain de la Grange (FR)

(73) Assignee: RENAULT s.a.s., Boulogne Billancourt (FR)

( * ) Notice: Subject to any disclaimer, the term of this patent is extended or adjusted under 35 U.S.C. 154(b) by 49 days.

(21) Appl. No.: 13/508,852

(22) PCT Filed: Sep. 30, 2010

(86) PCT No.: PCT/FR2010/052068
§ 371 (c)(1),
(2), (4) Date: Jun. 14, 2012

(87) PCT Pub. No.: WO2011/058253
PCT Pub. Date: May 19, 2011

(65) Prior Publication Data
US 2012/0240387 A1 Sep. 27, 2012

(30) Foreign Application Priority Data

Nov. 10, 2009 (FR) ...................... 09 57924

(51) Int. Cl.
*H02J 7/00* (2006.01)
*B60S 5/06* (2006.01)
(Continued)

(52) U.S. Cl.
CPC ... *B60S 5/06* (2013.01); *B60K 1/04* (2013.01); *B60L 11/1822* (2013.01);
(Continued)

(58) Field of Classification Search
CPC .............. G01R 31/3606; H01M 10/42; B60L 11/1822; B60L 11/18

USPC ............... 29/729, 739, 592.1; 104/34, 48–50; 320/2, 5, 109; 414/340, 401, 281
See application file for complete search history.

(56) References Cited

U.S. PATENT DOCUMENTS

| | | | | | |
|---|---|---|---|---|---|
| 4,450,400 | A | * | 5/1984 | Gwyn | 320/109 |
| 4,983,903 | A | * | 1/1991 | Bae et al. | 320/128 |

(Continued)

FOREIGN PATENT DOCUMENTS

| | | |
|---|---|---|
| DE | 10 2007 032 210 | 10/2008 |
| GB | 2 396 851 | 7/2004 |

OTHER PUBLICATIONS

French Search Report Issued Jun. 15, 2010 in FR 09 57924 Filed Nov. 10, 2009.

(Continued)

Primary Examiner — Minh Trinh
(74) Attorney, Agent, or Firm — Oblon, Spivak, McClelland, Maier & Neustadt, L.L.P.

(57) ABSTRACT

A method for replacing a container of input energy for a drive motor of a motor vehicle including at least one iteration of a phase including the following: recognizing the type of container to be deposited; making, if needed, at least one tool suitable for the container type; using the at least one tool to take down the container; depositing the container; and using the at least one tool to mount a new container. The making at least one tool suitable for the container type includes dismantling, on the at least one tool, a first device for activating and deactivating a first mechanism for locking the container onto the motor vehicle and mounting, on the at least one tool, a second device for activating and deactivating a second mechanism for locking the container onto the motor vehicle.

7 Claims, 2 Drawing Sheets

(51) Int. Cl.
  *B60K 1/04* (2006.01)
  *B60L 11/18* (2006.01)
  *H01M 2/10* (2006.01)
  *H01M 10/42* (2006.01)
(52) U.S. Cl.
  CPC ........ *B60L 11/1846* (2013.01); *B60L 11/1879* (2013.01); *H01M 2/1083* (2013.01); *H01M 10/42* (2013.01); *B60K 2001/0438* (2013.01); *B60K 2001/0455* (2013.01); *B60K 2001/0472* (2013.01); *H01M 10/4221* (2013.01); *Y02T 10/7005* (2013.01); *Y02T 10/705* (2013.01); *Y02T 10/7072* (2013.01); *Y02T 90/124* (2013.01); *Y02T 90/128* (2013.01); *Y02T 90/14* (2013.01); *Y02T 90/163* (2013.01); *Y02T 90/169* (2013.01); *Y04S 30/14* (2013.01)
  USPC .............. 320/104; 320/109; 29/729; 414/340

(56) References Cited

U.S. PATENT DOCUMENTS

| 5,612,606 | A | | 3/1997 | Guimarin et al. |
| 5,711,648 | A | * | 1/1998 | Hammerslag ................. 414/800 |
| 8,164,300 | B2 | * | 4/2012 | Agassi et al. ................. 320/104 |
| 2007/0113921 | A1 | | 5/2007 | Capizzo |
| 2009/0014224 | A1 | * | 1/2009 | Rydberg et al. ............. 180/68.5 |
| 2009/0314382 | A1 | | 12/2009 | Capizzo |
| 2010/0145717 | A1 | | 6/2010 | Hoeltzel |

OTHER PUBLICATIONS

International Search Report Issued Feb. 11, 2011 in PCT/FR10/52068 Filed Sep. 30, 2010.

* cited by examiner

METHOD AND SYSTEM FOR REPLACING A CONTAINER OF INPUT ENERGY FOR A DRIVE MOTOR OF A MOTOR VEHICLE

BACKGROUND

The present invention relates to a replacement method for replacing a container of input energy for powering a drive motor of a motor vehicle. The invention also relates to a replacement system for replacing a container of input energy for powering a drive motor of a motor vehicle that allows such a replacement method to be implemented and to a data support that allows such a replacement method to be implemented. The invention further relates to a replacement station for replacing a container of input energy that powers a drive motor of a motor vehicle.

Certain motor vehicles, such as electric or hybrid vehicles, comprise a container of input energy for powering a drive motor, such as a battery of electric accumulator cells that power an electric motor. It may prove advantageous to exchange this container, when its energy level becomes low, for a new container full of energy. This can be done at a station similar to a service station at which a motor vehicle fuel tank can be refilled.

DESCRIPTION OF THE RELATED ART

Document U.S. Pat. No. 5,612,606 discloses a station for exchanging the electric battery that powers a drive motor of an electric vehicle and a method for performing such an exchange. In the exchange station described, the driver positions the vehicle approximately in a rail, against a longitudinal end stop with respect to equipment belonging to the station. Thereafter, mobile electric-battery removal means are implemented.

In order to make it easy to roll out energy container exchange stations, it is necessary to make them, for a low cost, compatible with all the motor vehicles available on the market and with all the batteries available on the market.

BRIEF SUMMARY

Hence, an object of the invention is to provide a container-replacement method that redresses the abovementioned disadvantages and improves the replacement methods known from the prior art. In particular, the invention proposes an energy-container replacement method that is simple, economical and compatible with various types of motor vehicle and various types of container. The invention also relates to a replacement system for replacing an energy container. The invention also relates to a replacement station equipped with such a replacement system.

According to the invention, the method allows the replacement of a container of input energy that powers a drive motor of a motor vehicle. It is characterized in that it comprises at least one iteration of a phase comprising the following steps:
  recognizing the type of container to be removed,
  adapting, if necessary, at least one tool to suit the type of container,
  using the at least one tool to unfix the container,
  removing the container,
  using the at least one tool to refit a new container,
and in that the "adapting at least one tool to suit the type of container" step comprises a step of unfixing, from the at least one tool, a first device that activates and deactivates a first means of locking the container to the motor vehicle, and a step of fitting, to the at least one tool, a second device that activates and deactivates a second means of locking the container to the motor vehicle.

The phase may comprise the following steps:
  recognizing the type of motor vehicle,
  bringing the motor vehicle into position with respect to the ground on which it is resting.

The "bringing the motor vehicle into position with respect to the ground on which it is resting" step may comprise a step of activating a device that exerts mechanical actions on the vehicle at stringers or jacking points.

The devices that activate and deactivate the means of locking the container to the motor vehicle may be mounted on at least one manipulator robot.

The invention relates to a support for recording computer-readable data and on which there is recorded a computer program containing computer program code means for implementing the steps of the replacement method defined hereinabove.

According to the invention, the replacement system for replacing a container of input energy for powering a drive motor of a motor vehicle is characterized in that it comprises hardware means and software means for implementing the replacement method defined hereinabove.

The hardware means may comprise at least one manipulator robot provided with an interface for fixing a device that activates and deactivates means of locking the container.

The hardware means may comprise a recognition means for recognizing the type of motor vehicle and/or the type of energy container.

According to the invention, the replacement station for replacing a container of input energy that powers a drive motor of a motor vehicle is characterized in that it comprises a replacement system defined hereinabove.

The appended drawings depict, by way of example, one embodiment of a system for replacing an energy container according to the invention.

DETAILED DESCRIPTION

Figure 1:
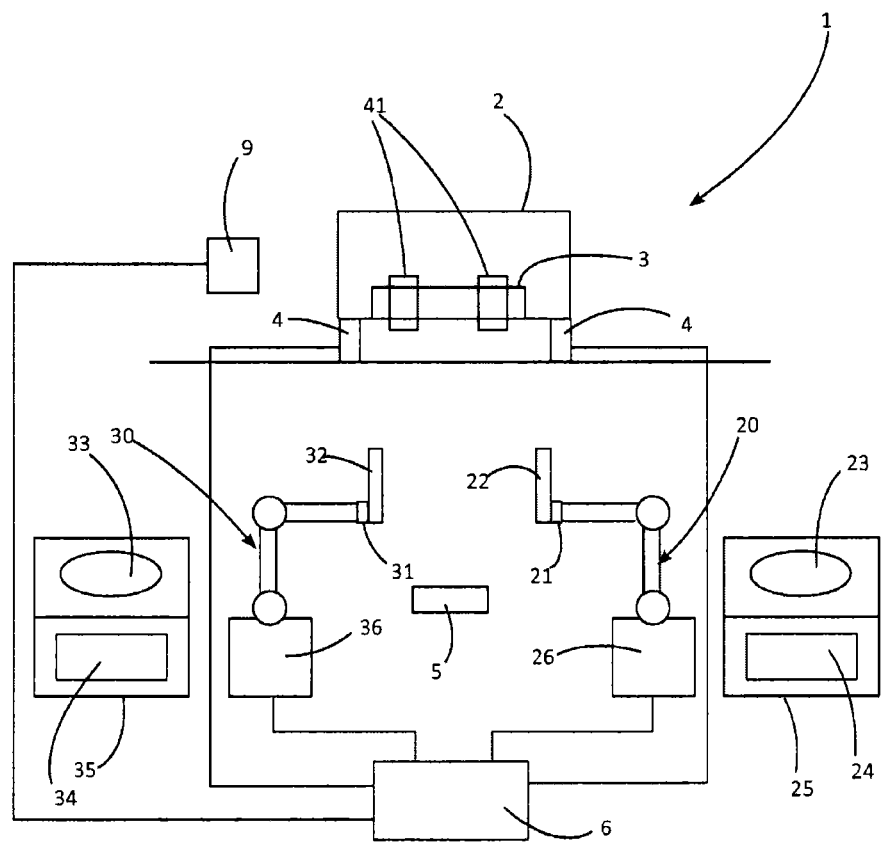
FIG. 1 is a transverse vertical schematic view of one embodiment of an energy-container replacement system according to the invention, the replacement system being in a first configuration.
Figure 2:
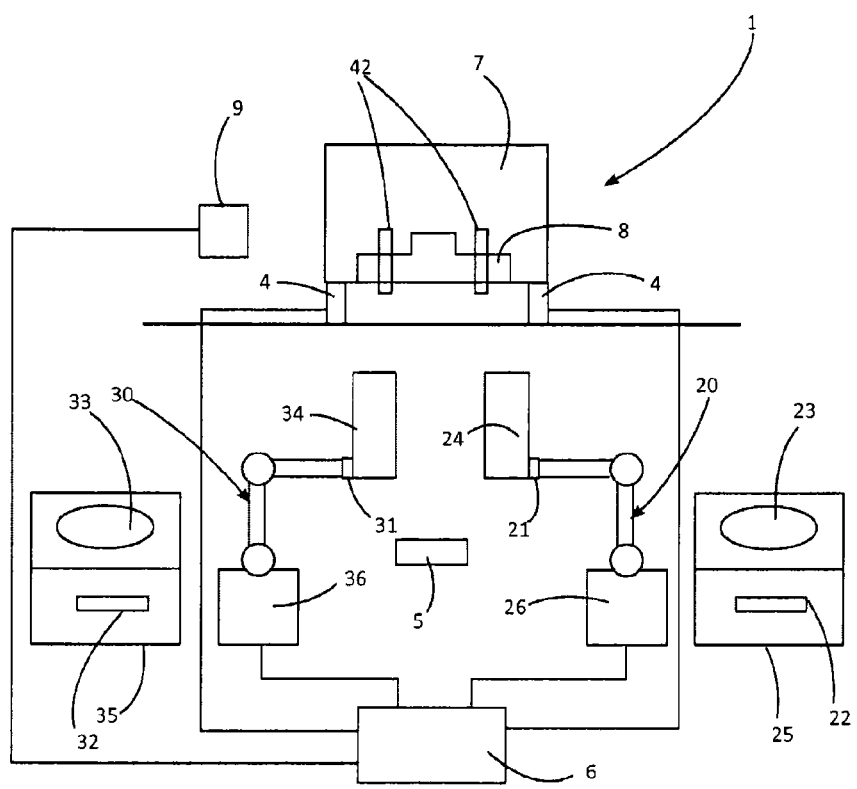
FIG. 2 is a transverse vertical schematic view of one embodiment of an energy-container replacement system according to the invention, the replacement system being in a second configuration.

The replacement system 1 for replacing a container 3, 8 of input energy that powers a drive motor of a motor vehicle 2, 7, depicted in FIGS. 1 and 2 in two different configurations, notably allows the replacement of an energy container of the battery of electric accumulator cells (electric battery) type used to supply electrical power to a drive motor of an electric vehicle. The replacement system chiefly comprises one or more tools 20, 30, one or more magazines intended for the storage of devices that activate and deactivate means of locking the containers to the motor vehicles and a device 4 for bringing the motor vehicle into position. For preference, the tools and/or the positioning device are controlled by a control unit 6. This control unit comprises hardware and/or software means of implementing the replacement method described below. The software means may notably comprise computer programs and a recording support containing such programs.

FIGS. 1 and 2 depict the battery replacement system in two different configurations.

In FIG. 1, the replacement system allows the replacement of a battery 3 of a first type fitted to a motor vehicle 2 of a first type. In this first type of motor vehicle, the battery 3 is fixed to the motor vehicle using a first type of locking means 41. Thus, the tools 20, 30 that allow the battery 3 to be fitted on and unfixed from the motor vehicle 2, which means that activate and deactivate the locking means 41, comprise devices 22, 32 that activate and deactivate locking means of a first type. They are connected to the rest 26, 36 of the tool, which for example consists of a manipulating robot, by attachment interfaces 21, 31.

In FIG. 2, the replacement system allows the replacement of a battery 8 of a second type fitted to a motor vehicle 7 of a second type. In this second type of motor vehicle, the battery 8 is fixed to the motor vehicle using a second type of locking means 42. Thus, the tools 20, 30 that allow the battery 8 to be fitted to and unfixed from the motor vehicle 7, which means that activate and deactivate the locking means 42, comprise devices 24, 34 that activate and deactivate locking means of a second type. They are connected to the rest 26, 36 of the tool by the attachment interfaces 21, 31.

When the devices that activate and deactivate the locking means are not being used, which means when they are not mounted on the tools, they are stored in magazines 25, 35. Only two types of locking means and of activating and deactivating devices have been mentioned hereinabove but there may be more than two of these in order to allow all batteries of all vehicles available on the market to be fitted and unfixed. In particular, there may, in the storage magazines, be a third type of activating and deactivating device 23.

The control unit 6 controls the actions of the tools. It is able to control the actions of activating the locking means, to control the actions of deactivating the locking means, to control the actions of movements of the tools and to control the actions of change of activating and deactivating devices. All these actions in particular are determined by information emitted by a recognition means 9 that recognizes the type of motor vehicle and/or the type of energy container, the recognition means being connected to the control unit 6. The recognition means may notably comprise an optical shape-recognition system or an RFID label reader.

The replacement system may also comprise a device 4 for positioning the motor vehicle. For preference, this device acts through the application of mechanical actions on the chassis of the motor vehicle, for example on stringers or jacking points. For example, the device comprises various means, for example four means, that can be moved automatically under the chassis of the motor vehicle until they are situated at various points determined by their longitudinal and transverse positions in relation to the motor vehicle. Once they are in their positions, the means can exert vertical mechanical actions on the chassis of the motor vehicle to bring the latter into position relative to a vertical axis. For preference, the movements and actions of the various means are themselves likewise controlled by the control unit 6 and, at least in part, determined by the data from the recognition means 9.

The structure of the locking means used to fix the batteries to the motor vehicles may vary according to the motor vehicle and the batteries. In addition, the number of locking means may also vary. Hence, the replacement system according to the invention comprises one, two, three or four or even more tools. Indeed, let us consider a replacement system comprising four tools and which needs to replace a battery on a vehicle comprising four locking means: the four tools can be used simultaneously to allow the battery to be replaced quickly. Let us now consider the same replacement system which has to replace a battery on a vehicle comprising just one locking means: just one of the tools is used.

It is also possible for the replacement system to comprise just one tool. If it has to replace a battery on a vehicle comprising several locking means, the tool may be used on each of the locking means in turn.

Thus, depending on the criteria adopted, it is possible to produce a replacement system that is more or less rapid and more or less expensive.

For preference, the replacement system also comprises a lift table device 5 that makes it possible to remove the spent battery and take it away and allows a fresh battery to be brought in and positioned under the motor vehicle or in the motor vehicle.

The system according to the invention affords various significant advantages:
  it is compatible with all types of battery and all types of motor vehicle,
  its cost of production is low in as much as the elements needed to make it compatible with all battery types and all motor vehicle types are reduced to a strict minimum: the device or devices that activate and deactivate the locking means.

The replacement system described above allows the replacement method for replacing a battery according to the invention to be implemented.

One embodiment of the replacement method according to the invention is described hereinbelow.

In a preliminary step, a motor vehicle the battery of which needs replacing is brought up to the replacement system.

The embodiment of the replacement method then comprises at least one iteration of the following phase, this phase being performed automatically, which means without human intervention between the various steps of which it is composed, or being performed semiautomatically, which means without human intervention between several of the steps of which it is composed.

In a first step, the type of battery installed on the motor vehicle is recognized. This step may be performed as the motor vehicle approaches. This step is chiefly performed using the recognition means described hereinabove.

In a second step, if necessary, at least one tool is adapted to suit the battery that is to be removed. If the tool does not correspond to the one needed for the battery-removal operation then it is adapted. For example, in the case of the system described hereinabove, if a battery of a second type has to be replaced, the activation and deactivation devices 22, of the first type are removed and stored in the magazines 25 and 35. Activation and deactivation devices 24, 34 of the second type are mounted on the tools in place of the devices previously removed. By contrast, if the tool does correspond to the one needed for the battery-removal operation, it is not modified.

In a third step, the at least one tool is activated, notably by moving the activation and deactivation device or devices until they come into contact with the locking means, and the at least one tool is used to unfix the battery, which means that the activation and deactivation device or devices is or are activated in order to deactivate the singular or plural locking means.

In a fourth step, the spent battery is removed and taken away.

In a fifth step, a fresh battery is brought in and positioned under or in the motor vehicle.

In a sixth step, the at least one tool is used to fit the new battery, which means that the device or devices is or are used to activate the singular or plural means that lock the fresh battery to the motor vehicle.

For preference, prior to the third step, the type of motor vehicle is recognized and the motor vehicle is positioned with respect to the ground on which it is resting. To do that, the positioning device that exerts mechanical actions on the vehicle at stringers or jacking points can be activated after the various means of which it is composed have been positioned under the chassis of the motor vehicle.

In a final step, the motor vehicle is taken away.

The invention claimed is:

1. A replacement method for replacing containers of input energy that power the drive motor of motor vehicles, comprising at least one iteration of a phase comprising:
    providing at least one tool including a first device that activates and deactivates a first means for locking a first container to a first motor vehicle, and a second device that activates and deactivates a second means for locking a second container to a second motor vehicle;
    recognizing on the first motor vehicle the first container to be removed;
    using the first device fitted on the at least one tool to unfix the first container;
    removing the first container;
    using the device fitted on the at least one tool to refit a new container;
    recognizing on the second motor vehicle the second container to be removed;
    unfixing, from the at least one tool, the first device and fitting, to the at least one tool, the second device to match the second container;
    using the second device fitted on the at least one tool to unfix the second container;
    removing the second container; and
    using the second device fitted on the at least one tool to refit a new container.

2. The replacement method as claimed in claim 1, wherein the phase comprises:
    recognizing a type of motor vehicle; and
    bringing the motor vehicle into position with respect to the ground on which it is resting.

3. The replacement method as claimed in claim 2, wherein the bringing a motor vehicle into position with respect to the ground on which it is resting comprises activating a device that exerts mechanical actions on the vehicle at stringers or jacking points.

4. The replacement method as claimed in claim 1, wherein the first and second devices that activate and deactivate the means of locking the container to a motor vehicle are mounted on at least one manipulator robot.

5. The replacement method as claimed in claim 1, wherein the first means for locking have a first structure, and the second means for locking have a second structure, different from the first structure.

6. The replacement method as claimed in claim 1, wherein the phase is performed automatically.

7. The replacement method as claimed in claim 1, wherein the phase is performed semi-automatically.

* * * * *